July 17, 1962  K. VÖGTLIN ETAL  3,044,307
SELF-CENTERING CLUTCH ASSEMBLY FOR PRECISION
INSTRUMENTS AND THE LIKE
Filed Feb. 13, 1961  2 Sheets-Sheet 1

INVENTORS:
Karl VÖGTLIN
Norbert HELMSCHROTT

By

Michael S. Striker their ATTORNEY

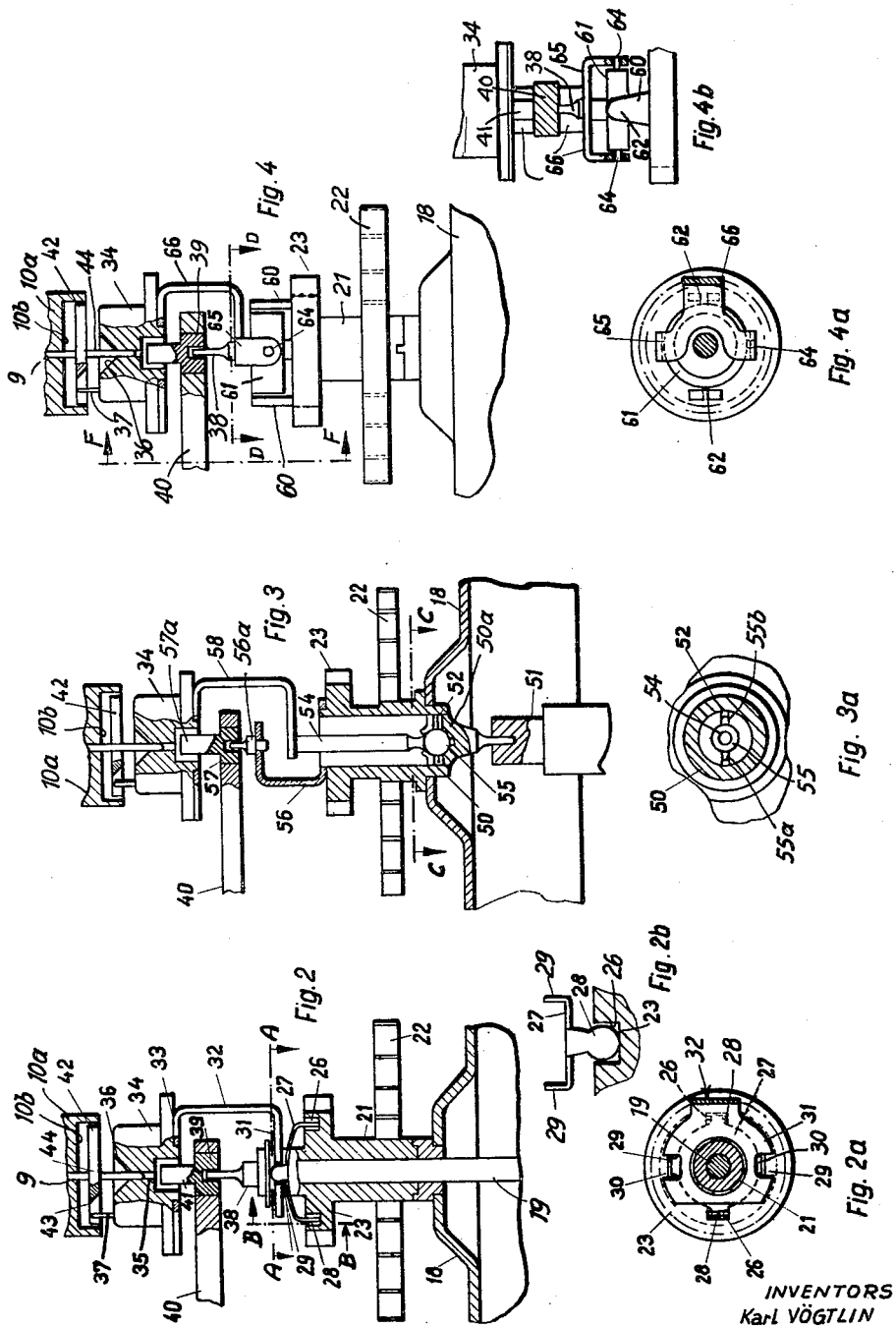

United States Patent Office 3,044,307
Patented July 17, 1962

3,044,307
SELF-CENTERING CLUTCH ASSEMBLY FOR PRECISION INSTRUMENTS AND THE LIKE

Karl Vögtlin, Villingen, Black Forest, and Norbert Helmschrott, Schwenningen (Neckar), Germany, assignors to Kienzle Apparate G.m.b.H., Villingen, Black Forest, Germany
Filed Feb. 13, 1961, Ser. No. 88,821
Claims priority, application Germany Feb. 18, 1960
4 Claims. (Cl. 73—519)

The present invention relates to clutch assemblies in general, and more particularly to a self-centering clutch assembly for use in precision measuring instruments, such as tachometers, tachographs and the like. Still more particularly, the invention relates to a rotary motion transmitting clutch assembly which is especially suited for releasably coupling one or more parts of a precision instrument which are mounted in a housing with the remaining parts of the same instrument mounted in a cover which is pivotally secured to the housing.

It is already known to provide a tachograph with a cover which is hinged to the housing and which carries the speed indicating pointer, a clockwork mechanism and/or a record receiving chart. The pointer forms part of a tachometer which is installed in the housing and which, therefore, is disconnected from the pointer whenever the cover is swung to its open position. All heretofore known clutch assemblies utilized for connecting the tachometer with the pointer and permitting a disconnection of the pointer from the tachometer in response to pivotal movements of the cover to its open position are of the rigid type, i.e. the connection is established by separable but rigidly mounted parts. A very serious drawback of such constructions is that the part or parts carried by the pivotable cover must be mounted with utmost precision in order to be properly centered with respect to and to be satisfactorily coupled with the complementary part or parts in the housing so as to insure that the transmission of motion occurs with negligible tolerances. It will be readily understood that such precise mounting and centering of cooperating rigidly mounted parts requires substantial skill, is time consuming, and adds considerably to the initial cost of the instrument. In addition, even if constructed and assembled with utmost precision, such rigid clutch assemblies cannot insure that the transmission of motion from the speed measuring part or parts in the housing to the speed indicating part or parts in the pivotable cover will occur without at least some errors. For example, a tolerance in the range of 0.1 mm. will cause substantial deviations between the measured and indicated speeds in a tachometer or tachograph which utilizes a rigid clutch assembly.

Accordingly, it is an important object of the present invention to provide a clutch assembly for releasably coupling two groups of parts in a precision instrument or the like which fully avoids the aforementioned drawbacks and deficiencies of rigid clutch assemblies and which insures that the transmission of motion occurs without or with negligible tolerances.

Another object of the invention is to provide a releasable clutch assembly of the just outlined characteristics whose separable clutch elements are centered in a fully automatic way when the movable component carrying one or more clutch elements is returned into proper position with respect to the stationary component which carries the complementary clutch element or elements.

A further object of the invention is to provide a clutch assembly for connecting the motion producing means in a fixed housing with the motion receiving means in a pivotable cover for the housing which is constructed and assembled in such a way that the accuracy with which the motion is transmitted to motion receiving means is not affected by frequent movements of the cover to its open and closed positions.

An additional object of the instant invention is to provide an improved automatically centering clutch assembly for connecting the drag-cup with the speed indicating pointer of a tachometer.

A concomitant object of the invention is to provide a novel universal joint for use in a clutch assembly of the above outlined characteristics.

Still another object of the invention is to provide a very simple, reliable, compact and highly accurate clutch assembly of the above outlined characteristics which may be readily installed in many instruments of presently known design without necessitating any or by necessitating only minor changes in the construction of such instruments.

With the above and certain other objects in view, the invention resides in the provision of a structure, e.g. a precision instrument such as a tachometer or a tachograph, which comprises a first part preferably assuming the form of a housing, a second part which may assume the form of a cover hinged to the housing for movements between an operative or closing and an inoperative or open position, a rotary motion producing first component such as the drag-cup of a tachometer which is mounted in the housing, a rotary motion receiving second component such as the speed indicating pointer of the tachometer which is rotatably mounted in the cover, and a releasable self-centering clutch assembly for transmitting rotary movements of the drag-cup to the pointer. This clutch assembly comprises a first clutch element which is drivingly connected with the pointer, a second clutch element which is received in and is tiltable with respect to the housing, means provided on the clutch elements for drivingly connecting the second clutch element with the first clutch element when the cover is in operative position, self-centering means provided on the clutch elements for aligning the second clutch element with the first clutch element when the cover is in operative position, and a universal joint which connects the drag-cup with the second clutch element in such a way that the second clutch element is tiltable in all directions but is immediately rotatable in response to all, even mimimal, angular displacements of the drag-cup.

Certain other features of the invention reside in the provision of specially constructed releasable connecting means on the two clutch elements, in the provision of specially constructed self-centering means on the two clutch elements, and in the provision of specially constructed universal joints for the second clutch element.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 2 is an enlarged axial section through the clutch assembly;

FIG. 2a is a transverse section taken along the line A—A of FIG. 2, as seen in the direction of arrows;

FIG. 2b is a fragmentary section taken along the line B—B of FIG. 2, as seen in the direction of arrows;

FIG. 3 is an axial section through a slightly modified clutch assembly;

FIG. 3a is a transverse section taken along the line C—C of FIG. 3, as seen in the direction of arrows;

FIG. 4 is a partly elevational and partly sectional view of a further clutch assembly;

FIG. 4a is a transverse section taken along the line D—D of FIG. 4, as seen in the direction of arrows; and FIG. 4b is a fragmentary partly elevational and partly sectional view as seen in the direction of arrows from the line F—F of FIG. 4.

Figure 1:
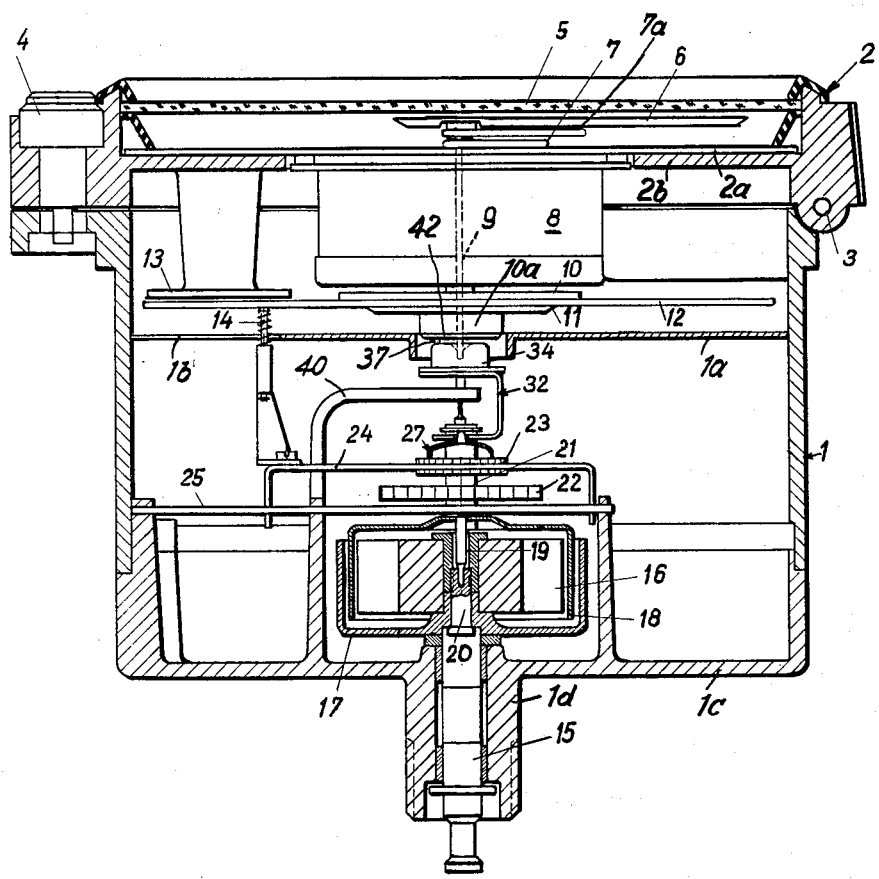
FIG. 1 is an axial section through a tachograph comprising a clutch assembly which embodies one form of our invention.

Referring now in greater detail to the illustrated embodiments, and first to FIG. 1, there is illustrated a measuring instrument here shown as a tachograph which comprises a stationary part in the form of a composite housing 1, a movable part in the form of a swingable cover 2 which is connected with the housing by a hinge 3 for movements between the operative position of FIG. 1 and an inoperative position, and a locking device 4 by means of which the cover may be releasably secured to the housing to remain in its operative position.

The cover 2 carries at its outer side a transparent pane 5 and encloses a supporting plate 2a for a clockwork 8 whose hollow shafts mount the hour indicating hand 7, the minute hand 7a, and coaxially receive the arbor 9 of a rotary motion receiving component in the form of a speed indicating pointer 6. The hands 7, 7a and the pointer 6 are disposed rearwardly of and are thus protected by the pane 5. The hands 7, 7a are rotated by the clockwork 8 in the customary way. Adjacent to its inner side, the clockwork 8 carries a plate like base 10 for a graduated record receiving chart 12 which is retained in position by a removable clamping disk 11 made of sheet metal or the like. As is well known in the art, the chart 12 is rotated by the clockwork 8 at a predetermined speed so that it completes a revolution in a given period of time. The chart 12 and the clamping disk 11 are formed with concentric apertures for a boss 10a which extends inwardly from the base 10. The supporting plate 2a is mounted on an annular intermediate wall 2b which carries an eccentric inwardly extending anvil 13 serving as a backing for one or more record producing styluses 14. FIG. 1 shows a tachograph with a single stylus whose spring-biased tip is in permanent contact with the inner side of the record receiving chart 12. The stylus 14 extends through a cutout 1b formed in a radial partition 1a inserted into the housing 1 inwardly of the chart 12.

The bottom wall 1c of the stationary housing 1 is formed with a rearwardly extending hub 1d which rotatably receives a coaxial drive shaft 15 for a permanent magnet 16. A magnetic field member in the form of an iron cup 17 surrounds the magnet 16 and defines therewith an air gap so that the magnetic force lines of the magnet pass in a closed path extending partly through the member 17. The air gap between the magnet 16 and the member 17 receives the annular flange of a rotary motion producing component in the form of a drag-cup 18 comprising a coaxial journal 19 which is rotatably received in a thrust bearing 20 of the magnet 16. The drag-cup 18 further comprises an outwardly extending shaft 21 which carries a motion-transmitting pinion 23 and is under the permanent bias of a flat hairspring 22, one end of this spring being connected to the housing 1 in a manner not shown in the drawings, and the spring having its other end connected with the shaft 21. The pinion 23 meshes with a toothed rack 24 which is reciprocably guided in an elongated supporting bar 25, the latter being fixedly mounted in the housing 1. The rack 24 supports and transmits motion to the stylus 14 by being movable in a first radial direction under the action of the drag-cup 18 and pinion 23, and in the opposite radial direction under the action of the spring 22.

The improved clutch assembly operatively connects the pinion 23 of the motion producing drag-cup 18 with the arbor 9 of the motion receiving pointer 6, the arbor being rotatable in the clockwork 8 and extending outwardly through the hollow shafts of the hands 7, 7a. The arbor 9 and the pointer 6 are swingable with the cover 2 when the latter pivots about the hinge 3, and the purpose of the clutch assembly is to insure that the arbor will transmit angular displacements of the speed-measuring, motion producing drag-cup 18 to the motion receiving pointer 6 with utmost accuracy. As is well known in the art of tachometers, the angular displacement of the drag-cup 18 under the action of the revolving magnet 16 and against the bias of the spring 22 is proportional with the rotational speed of the magnet and with the speed of the vehicle in which the instrument of FIG. 1 is installed. The stylus 14 records on the constantly revolving chart 12 the momentary speeds of the vehicle as a function of time by plotting on the chart a curve constituting a permanent record of the speeds whenever the vehicle is in motion. The radial sections of the curve plotted by the stylus on the record-receiving inner side of the chart 12 indicate not only the speeds but also the intervals of time when the vehicle is in motion, while the concentric arcuate sections of the curve indicate that the stylus was at a standstill, i.e. that the engine of the vehicle was either idling or that the engine was shut off.

The self-centering clutch assembly for releasably coupling the drag-cup 18 with the arbor 9 of the pointer 6 is shown in greater detail in FIGS. 2, 2a and 2b. The outer side of the pinion 23 is formed with two recesses 26 which are diametrically opposed to each other, these recesses receiving two inwardly extending flat motion transmitting projections or wings 28 of a coupling member in the form of an apertured disc 27. As shown in FIG. 2a, the projections 28 are disposed in two spaced axially parallel planes and are of substantially circular contour (see FIG. 2b) so that they articulately connect the coupling member with the drag-cup 18 and are free to pivot with the coupling member about an axis which is perpendicular to the common rotational axis of the drag-cup and of the pinion 23. The coupling member 27 is formed with two additional flat circular projections or wings 29 which are disposed in two parallel planes enclosing right angles with the planes of the projections 28 and which are bent outwardly, i.e. toward the cover 2. The projections 29 extend into two diametrically opposed recesses 30 of an arm 31 forming the inner part of a stirrup-shaped connecting member 32. Thus, the projections 29 articulately connect the coupling member 27 with the connecting member 32 for pivotal movements about an axis which encloses right angles with the common axis of the projections 28 and with the rotational axis of the drag-cup 18. The outer arm 33 of the connecting member 32 carries and is rigid with a female clutch element 34 which is formed with a coaxial centering bore 35 having a conically diverging outer end portion 36. The female clutch element 34 is further provided with an eccentric clutch pin 37 which extends outwardly from the outer end face of this element and is snugly receivable in a radial guide slot 43 formed in the inner side of a male clutch element 42, the latter being drivingly connected to and rotatable with the inner end of the arbor 9. The clutch pin 37 and the guide slot 43 together constitute means for drivingly connecting the element 34 with the element 42 when the cover 2 is in operative position.

As clearly shown in FIG. 2, the shaft 21 of the drag-cup 18 constitutes the hub of the pinion 23 and its outer end is properly centered by a pin 38 which is rotatable in a journal bearing 39 provided in a fixed frame member 40 forming part of or connected to the housing 1. The bearing 39 comprises an outwardly extending centering pin 41 which is rotatably and loosely received in a coaxial blind bore formed in the inner end face of the female clutch element 34 whereby the clutch element 34 and the universal joint 27, 32 are free to pivot in all directions with respect to the rotational axis of the drag-cup 18. The centering pin 41 simultaneously prevents excessive tilting of the element 34 when the latter is disconnected from the element 42.

The male clutch element 42 comprises a coaxial inwardly extending centering pin 44 which is receivable in the bore 35 of the female clutch element 34, the pin 44 constituting a coaxial extension of the arbor 9 so that the male clutch element 42 is properly and automatically centered on the element 34 when the centering pin 44 is received in the bore 35. The conical outer end portion 36 of the bore 35 facilitates the connection and separation of clutch elements 34, 42, and its inwardly converging wall guides the pin 44 toward the bore 35 and tilts the female element 34 when the cover 2 is pivoted toward the position of FIG. 1. Thus, the self-centering means 35, 44 automatically aligns the clutch element 34 with the clutch element 42 when the cover 2 assumes its operative position and closes the open end of the housing 1.

The clutch assembly of FIGS. 1 and 2 operates as follows:

When the vehicle embodying the tachograph of FIG. 1 is in motion, the drive shaft 15 and the magnet 16 rotate at a speed which is proportional with the forward speed of the vehicle, and the eddy currents produced by the magnet 16 cause an angular deflection of the drag-cup 18 against the bias of the hairspring 22 to thereby turn the pinion 23 which, in turn, transmits its angular displacement to the connecting member 32 through the coupling member 27. Since the outer arm 33 of the member 32 is rigid with the female clutch element 34, the latter participates in the angular displacement of the drag-cup 18 and, through its clutch pin 37, transmits the angular displacement to the male clutch element 42, to the arbor 9, and hence to the pointer 6. The coupling member 27 with its pairwise arranged projections 28 and 29, and the connecting member 32 constitute a universal joint between the pinion 23 of the drag-cup 18 and the female clutch element 34 thus allowing tilting movements of the element 34 in any desired direction but immediately transmitting any, even slightest, rotational movements in response to angular displacements of the rotary motion producing drag-cup 18.

If the locking device 4 is released and the cover 2 is swung in clockwise direction, as viewed in FIG. 1, the clutch pin 37 remains stationary while the male clutch element 42 withdraws its centering pin 44 from the bore 35 to terminate the driving connection between the clutch element 34 and the arbor 9. If the operator thereupon returns the cover 2 to the position of FIG. 1, the centering pin 44 engages the wall of the conical bore portion 36 and tilts the female clutch element 34 about the common axis of the projections 28 or 29, depending on the momentary angular position of the pinion 23. In the position of FIG. 1, the closing movement of the cover 2 would cause the centering pin 44 to tilt the female clutch element 34, the connecting member 32 and the coupling member 27 about the common axis of the projections 29. The centering pin 44 then slides along the conical wall of the bore portion 36 and is received in the bore 35 as soon as the cover 2 is returned to its fully closed position whereby the male clutch element 42 is properly centered with respect to the female clutch element 34 and the clutch pin 37 automatically enters the guide slot 43 to transmit to the arbor 9 and to the pointer 6 any angular displacements of the drag-cup 18 caused by the revolving magnet 16 or by the return spring 22. The radial distance between the pins 37 and 44 in closed position of the cover 2 is always the same; this insures that the angular displacements of the drag-cup 18 are transmitted to the pointer 6 with utmost accuracy.

FIGS. 3 and 3a illustrate a clutch assembly which differs only slightly from the assembly of FIG. 2. The drag-cup 18 comprises a hollow shaft 50 having an inwardly projecting extension 50a constituting a journal which is rotatably received in a thrust bearing defined by the coaxial trunnion 51 of the permanent magnet, not shown in FIG. 3. The outer side of the extension 50a is formed with a diametrically extending open recess 52. The female clutch element 34 is rigid with the outer arm of a connecting member or stirrup 58 whose inner arm is connected with a coupling member in the form of a shaft 54, the latter having a spherical inner end portion or ball 55 which is provided with two radial stud-like projections or wings 55a, 55b. The projections 55a, 55b are coaxial, i.e. they are diametrically opposed to each other and extend into the recess 52. The connecting member 58 and the coupling member 54 with its head 55 and projections 55a, 55b constitute a universal joint between the extension 50a of the drag-cup 18 and the female clutch element 34 to permit tilting movements of this clutch element but transmitting all angular displacements of the drag-cup to the male clutch element 42 when the cover 2 is in closed position. The rack which meshes with the pinion 23 to move the stylus in response to angular displacements of the drag-cup 18 under the action of the permanent magnet or under the action of the restoring spring 22 has been omitted for the sake of clarity. It will be noted that, in the position of FIG. 3, the projections 55a, 55b are slightly spaced from the bottom wall of the recess 52 so that the shaft 54 is tiltable in its seat about the common axis of the projections 55a, 55b and about a second axis which is perpendicular to this common axis and to the axis of the shaft 50.

The pinion 23 carries a U-shaped bracket 56 which mounts a centering pin 56a extending into the bore of a journal bearing 57 mounted in the fixed frame member 40 so as to maintain the drag-cup 18 in properly centered position. The bearing 57 comprises a centering pin 57a which is a functional equivalent of the pin 41 shown in FIG. 2. The construction of the clutch elements 34 and 42 is the same as described in connection with FIGS. 1 and 2.

The projections 55a, 55b articulately connect the coupling shaft 54 with the drag-cup 18 for pivotal movements about an axis which encloses right angles with the rotational axis of the drag-cup. It will be noted that, in contrast to the clutch assembly of FIG. 2 wherein the connecting member 32 is articulately connected with the coupling member 27, the coupling shaft 54 is rigid with the connecting member 58 but is pivotable with respect to the drag-cup 18.

Referring now to FIGS. 4, 4a and 4b, there is shown a different clutch assembly which comprises a connecting member or stirrup 66 rigid with the female clutch element 34 and forming part of a somewhat different universal joint which articulately connects the element 34 with the pinion 23 of the rotary motion producing drag-cup 18. The pinion 23 carries a pair of outwardly extending lugs or eyes 60 which rotatably support two diametrically opposed projections or pivot axles 62 of an annular coupling member 61 in such a way that the coupling member is tiltable about an axis which is perpendicular to the axis of the pinion 23. The coupling member 61 carries a pair of diametrically opposed second projections or pivot axles 64 which are rotatably received in a pair of inwardly extending lugs or eyes 65 connected to or integral with the inner arm of the connecting member 66. The eyes 65 are turned through 90 degrees with respect to the eyes 60 so that the connecting member 66 and the female clutch element 34 are tiltable about the common axis of the projections 62 together with the coupling member 61 and/or about the common axis of the projections 64 with respect to the coupling member 61. The journal or centering pin 38 of the drag-cup 18 is received in the bore of the bearing 39 on the frame member 40 in the same way as described in connection with FIG. 2.

It will be readily understood that the position of the clutch elements 34, 42 may be reversed, i.e. that the female clutch element may be connected with the arbor 9. As clearly shown in FIGS. 2, 3 and 4, the male clutch element 42 is received in a suitable depression 10b of the boss 10a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A structure of the character described comprising, in combination, a first part; a second part movable with respect to said first part between an operative and an inoperative position; a rotary motion producing first component having an axis of rotation and turnably mounted in one of said parts; a rotary motion receiving second component mounted in the other part; and a releasable clutch assembly for transmitting rotary movements of said first component to said second component, said clutch assembly comprising a first clutch element drivingly connected with said second component, a second clutch element mounted in said one part and tiltable about a pair of axes which are substantially perpendicular to each other and to said first mentioned axis, means provided on said elements for drivingly connecting the second clutch element with the first clutch element when said second part is in operative position, self-centering means provided on said elements for aligning said second clutch element with said first clutch element when said second part is in operative position, a universal joint for transmitting rotary movements of said first component to said second clutch element, and means mounted in said one part for limiting tilting movements of said second clutch element about said pair of axes so that said self-centering means automatically aligns said second clutch element with said first clutch element when said second part is moved to its operative position.

2. In a measuring instrument, in combination, a fixed housing; a cover hinged to and movable with respect to said housing between a closing and an open position; a rotary motion producing first component mounted in said housing; a rotary motion receiving second component mounted in said cover; and a releasable self-centering clutch assembly for transmitting rotary movements of said first component to said second component, said clutch assembly comprising a first clutch element drivingly connected with said second component, a second clutch element mounted for limited tilting movements in said housing, means provided on said elements for drivingly connecting the second clutch element with the first clutch element when said cover is in closing position, self-centering means provided on said elements for aligning said second clutch element with said first clutch element when said cover is in closing position, and a universal joint for transmitting rotary movements of said first component to said second clutch element, said joint comprising a stirrup shaped connecting member having a first and a second arm, one of said arms rigid with said second clutch element, a coupling shaft rigid with the other arm of said connecting member and coaxial with said first component, said shaft comprising a spherical head including a pair of diametrically opposed coaxial projections enclosing right angles with the rotational axis of and pivotably received in a recess defined by said first component so that said shaft is tiltable about the common axis of said projections and about an axis which is perpendicular to said first mentioned axes, a bracket rigid with said first component, a frame member rigid with said housing, a bearing mounted in said frame member and comprising a centering pin loosely received in a bore formed in said second clutch element, and a second centering pin mounted on said bracket and received in a bore formed in said bearing.

3. In a measuring instrument, in combination, a fixed housing; a cover hinged to and movable with respect to said housing between a closing and an opening position; a rotary motion producing first component mounted in said housing; a rotary motion receiving second component mounted in said cover; and a releasable self-centering clutch assembly for transmitting rotary movements of said first component to said second component, said clutch assembly comprising a first clutch element drivingly connected with said second component, a second clutch element mounted for limited tilting movements in said housing, means provided on said elements for drivingly connecting the second clutch element with the first clutch element when said cover is in closing position, self-centering means provided on said elements for aligning said second clutch element with said first clutch element when said cover is in closing position, and a universal joint for transmitting rotary movements of said first component to said second clutch element, said joint comprising a stirrup shaped connecting member rigid with said second clutch element, a coupling member comprising a first pair of spaced projections extending into recesses formed in said connecting member to articulately connect said coupling member with said connecting member for pivotal movements about an axis enclosing right angles with the rotational axis of said first component and a second pair of spaced projections extending into recesses formed in said first component to articulately connect said coupling member with said first component for pivotal movements about an axis enclosing right angles with said first mentioned axes, a frame member rigid with said housing, a bearing mounted in said frame member and comprising a centering pin loosely received in a coaxial bore of said second clutch element, and a second centering pin rigid with said first component and received in a bore formed in said bearing.

4. In a measuring instrument, in combination, a fixed housing; a cover hinged to and movable with respect to said housing between a closing and an open position; a rotary motion producing first component mounted in said housing; a rotary motion receiving second component mounted in said cover; and a releasable self-centering clutch assembly for transmitting rotary movements of said first component to said second component, said clutch assembly comprising a first clutch element drivingly connected with said second component, a second clutch element mounted for limited tilting movements in said housing, means provided in said elements for drivingly connecting the second clutch element with the first clutch element when said cover is in closing position, self-centering means provided on said elements for aligning said second clutch element with said first clutch element when said cover is in closing position, and a universal joint for transmitting rotary movements of said first component to said second clutch element, said joint comprising a stirrup shaped connecting member rigid with said second clutch element, a coupling member comprising two pairs of projections enclosing right angles with each other, a first pair of eyes provided on said connecting member and rotatably receiving one pair of said projections for pivotal movements of said coupling member about an axis enclosing right angles with the rotational axis of said first component, a second pair of eyes provided on said first component and rotatably receiving the other pair of said projections for pivotal movements about an axis enclosing right angles with said first mentioned axes, a frame member rigid with said housing, a bearing mounted in said frame member and comprising a centering pin loosely received in a coaxial bore of said second clutch element, and a second centering pin rigid with said first component and received in a bore formed in said bearing.

References Cited in the file of this patent

UNITED STATES PATENTS

| | | |
|---|---|---|
| 278,024 | Kromer | May 22, 1883 |
| 2,070,636 | Yates | Feb. 16, 1937 |
| 2,746,832 | Blakeslee | May 22, 1956 |
| 2,982,594 | Riegger | May 2, 1961 |